Patented June 16, 1936

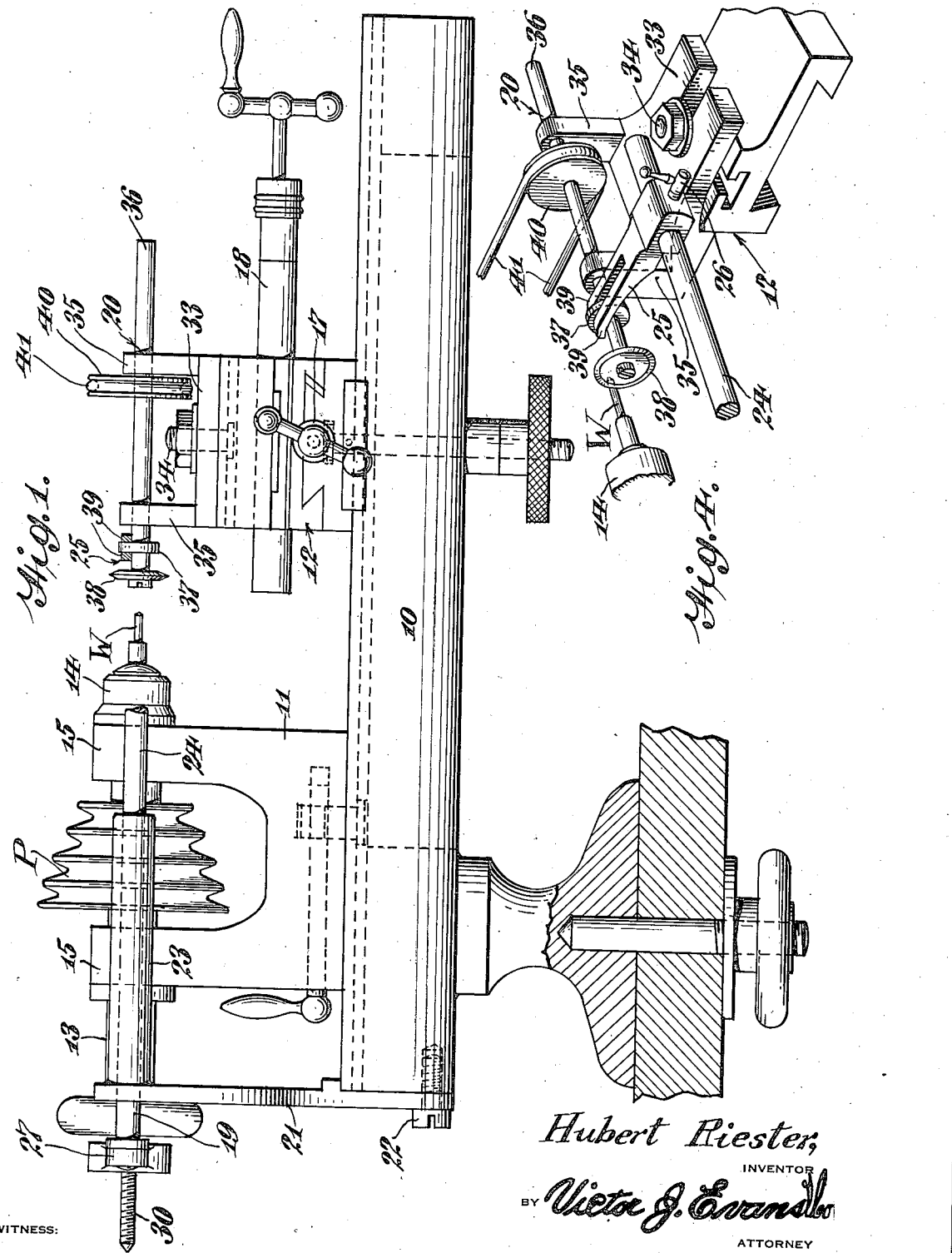

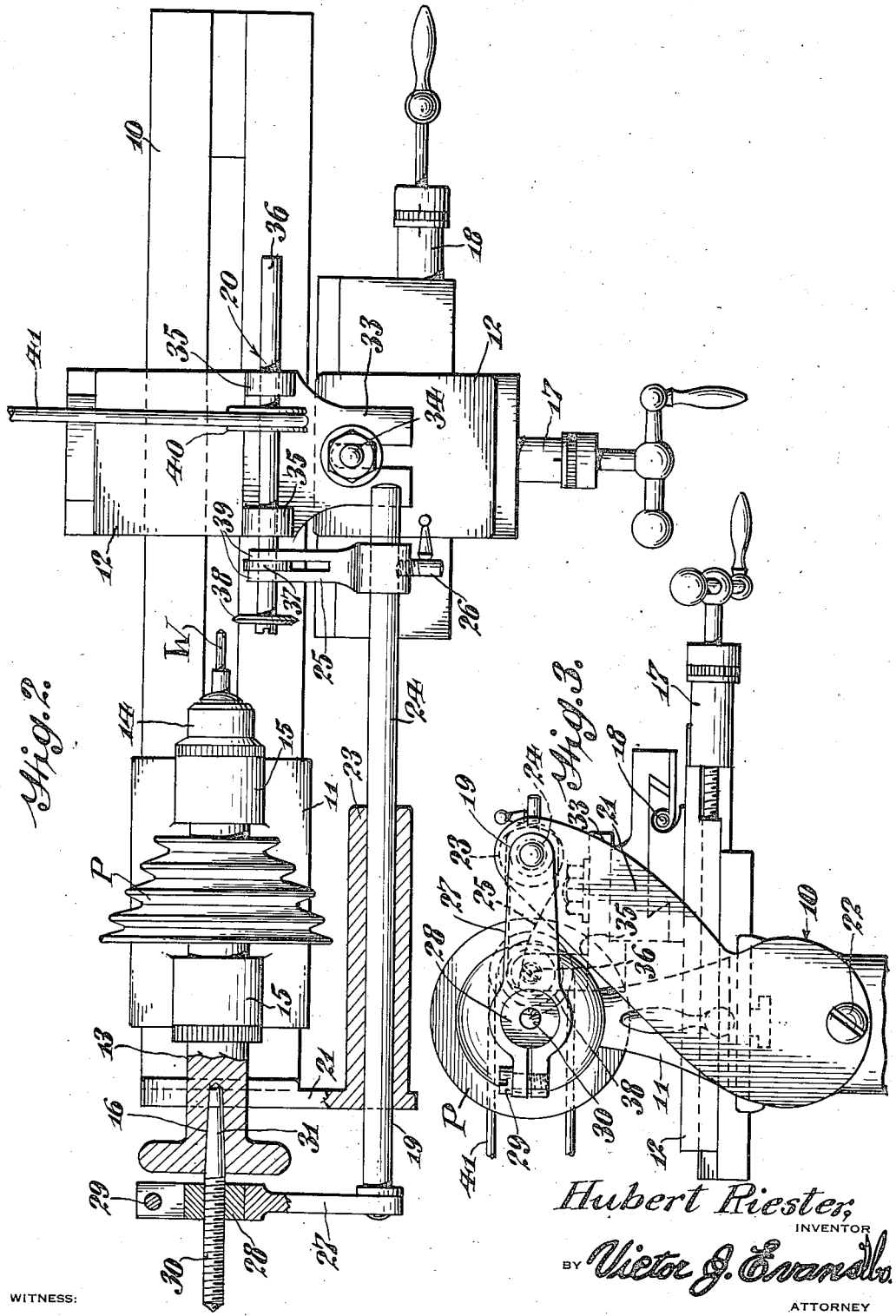

2,044,635

UNITED STATES PATENT OFFICE 2,044,635

SCREW CUTTING ATTACHMENT FOR LATHES

Hubert Riester, Collingswood, N. J.

Application June 19, 1934, Serial No. 731,365

2 Claims. (Cl. 10—154)

This invention relates to a screw cutting attachment for lathes and more particularly to an apparatus which when applied to a lathe will in the smaller type of lathe, such as jewelers' or watch makers' lathes permit the semi-automatic cutting of screw threads and in the large type of lathe will permit cutting of threads for which the lathe is not in itself adapted.

An important object of the invention is the provision in a device of this character of an apparatus which may be applied to the lathe as an attachment and may be readily and conveniently removed therefrom when its use is not desired, although the apparatus may be incorporated in the lathe as a permanent part thereof.

A further object of the invention is the provision in an apparatus of this character of means whereby the various settings may be conveniently effected without disturbing the structure of the lathe proper except in a minor and wholly inconsequential detail which will not in any way interfere with the normal operation of the lathe. These and other objects are obtained by the structure shown in the accompanying drawings wherein for the purpose of illustration the embodiment of the invention is shown.

In the drawings:—

Figure 1 is a front elevation partially in section showing a lathe equipped with an attachment constructed in accordance with the invention.

Figure 2 is a plan view thereof partly in section.

Figure 3 is an end elevation thereof.

Figure 4 is a fragmentary perspective illustrating the manner of connecting the traverse mechanism with the cutter mechanism.

Referring now more particularly to the drawings numeral 10 generally designates a lathe bed mounting a usual head stock 11 and tool slide 12. The head stock of such lathes embodies a live spindle 13 mounting a chuck 14 and disposed in suitable bearings 15. In the smaller type of lathe the outboard end of spindle 13 is equipped with a taper socket 16 adapted for the reception of small tools for action on work not incompatible with the swing of the lathe. As is usual in such lathes the tool slide 12 is equipped with means as at 17 and 18 whereby the slide may be adjusted both transversely and longitudinally of the bed.

In accordance with the invention the lathe is equipped with mechanism which may be generally divided into two sections, a traverse section generally designated at 19 and a cutting mechanism generally designated at 20. The traverse mechanism 19 comprises a bracket 21 rigidly secured to the lathe bed as by screw 22 and incorporating in the present showing a tubular guide 23 open at both the outboard and inboard ends of the lathe. Slidable in this guide is a rod 24 having at its inboard end a shifting fork 25, the connection of which with the rod is releasable to permit rotation of the shifting fork, and it is held fixed, such as by means of a set screw 26. At the outboard end, the rod 19 is equipped with an arm 27 constructed as a split jaw clamp adapted to interchangeably receive nut 28 which may be securely held by adjustment of screw 29. The nuts 28 are differently threaded and adapted for the reception of traverse screws 30 each of which is equipped with means as at 31 for engagement in the socket in the outboard end of spindle 13. While in the present instance the socket and spindle engagement is illustrated as of the tapered type commonly employed in the smaller lathes wherein friction is depended upon to prevent relative rotation of the traverse screw 30 and spindle 13, it will be understood that any desired type of mechanism may be employed to provide this connection and any means employed to insure against relative rotation of spindle 13 and screw shank 31.

The cutter mechanism comprises a bracket 33 which may be attached to the tool slide by the usual tool attachment bolt 34. This bracket has upstanding therefrom a pair of ears 35 constituting bearings rotatably mounting a shaft 36. The mounting of shaft 36 is in such manner that it may have longitudinal as well as rotational movement, and outwardly of the forward ear 35, the shaft is equipped with a collar 37 and has its extremity adapted for the reception of milling cutters 38. The shifting fork 25 which embodies a pair of spaced arms 39 is adapted to straddle the collar 37 above or below the shaft 36 and may be moved into or out of engagement with this collar by rotatable movement of the shifting fork 25 about the rod 24 as an axis. The shaft 36 between the ears 35 is at present shown as equipped with a pulley 40 cooperating with a belt 41 driven from any suitable source which should in an apparatus of the type at present illustrated be located at a sufficient distance from the shaft 36 to enable the shaft 36 to be shifted longitudinally to a distance permissible and regulated by the spacing of ears 35 and the axial length of pulley 40. It will however be understood that any convenient means may be provided to drive the shaft which will permit the shaft to both rotate and shift longitudinally under the influence of the traverse mechanism.

In the use of the apparatus the bracket 33 is secured to the tool slide 12 and if necessary the bracket 21 is secured to the lathe bed, although the bracket 21, due to its location, will not interfere with the normal operation of the lathe unless as is unusual, it is desired to longitudinally adjust the head stock 11. The rod 24 is placed in position in the tubular guide 23 and the proper die and its associate screw 30 are selected and the screw threaded into the die. The shank 31 is then secured in the outboard end of spindle 13 and it will be obvious that as the spindle 13 is rotated, by hand manipulation or by the pulleys P ordinarily attached to the spindle the rod 24 will be moved longitudinally through the guide 23. The work W, or in other words, the blank from which the screw is to be constructed, is placed in the chuck 14 of the spindle 13 and a proper cutter 38 is secured to the adjacent end of shaft 36. This cutter, by means of the usual adjustments for slide 12 is adjusted so that it will properly engage with the work W and the shifting fork 25 is adjusted to engage the collar 37. The spindle is then rotated, which causes the work W to rotate and the cutter to move longitudinally of the work for cutting the thread groove therein, and by this structure, it will be seen that the thread groove cut in work W by the cutter 38 will have a thread corresponding to that of nut 28 and the screw 30. If the depth of the cut provided is not sufficient to permit a clean fit with the nut for which work W is adapted for cooperation, the thread may be deepened by adjustment of the transverse slide screw 17. The work W may comprise either ordinary screws or tap stock or any other threaded construction which it is desired to produce.

Since the mechanism illustrated is not only capable of considerable modification but is likewise capable of permanent incorporation in the lathe without in any manner departing from the spirit of the invention it is to be understood that the particulars of the invention herein illustrated are in no way limitative except as hereinafter claimed.

The invention having been set forth, what is claimed is:

1. In a lathe, a live spindle having chucking means at opposite ends thereof, a cutter bearing shaft axially paralleling the spindle at one end thereof and mounted for rotation and axial reciprocation, means to rotate the shaft and means to reciprocate said shaft including complementally threaded elements one of which is engaged in the chuck at the opposite end of the spindle and the other of which is connected to the shaft, the connections between said other threaded element and the shaft comprising a clamp engaging said other element, a rod connected to the clamp and a shifting fork carried by said rod and engaging the shaft, said shifting fork being rotatably and longitudinally adjustable upon said rod.

2. The combination with a lathe, including the usual head stock, its live spindle and a tool slide, a bracket mounted on the tool slide providing bearings, a shaft mounted in said bearings for rotation and axial reciprocation, means to rotate said shaft, a cutter on said shaft, means operatively connecting said shaft and said live spindle and constructed and arranged to longitudinally shift said shaft as the live spindle is rotated, said means including a threaded member chucked in the outboard end of said live spindle, a guide stationary with relation to the head stock, a rod shiftable longitudinally of the lathe in said guide, an arm on said rod having a clamp mounting a threaded element complemental to the threaded element of the spindle, and means operatively connecting said shaft and rod whereby the shaft is longitudinally shifted by the rod, said operatively connecting means including a collar fixed to the shaft, a fork mounted for rotary and longitudinal movements on the rod, means for fixing the fork to the rod, and the arms of the fork straddling the collar for engagement therewith.

HUBERT RIESTER.